June 4, 1946. D. RICHARDS 2,401,317
MOTOR CAR
Filed Nov. 25, 1942 3 Sheets-Sheet 1
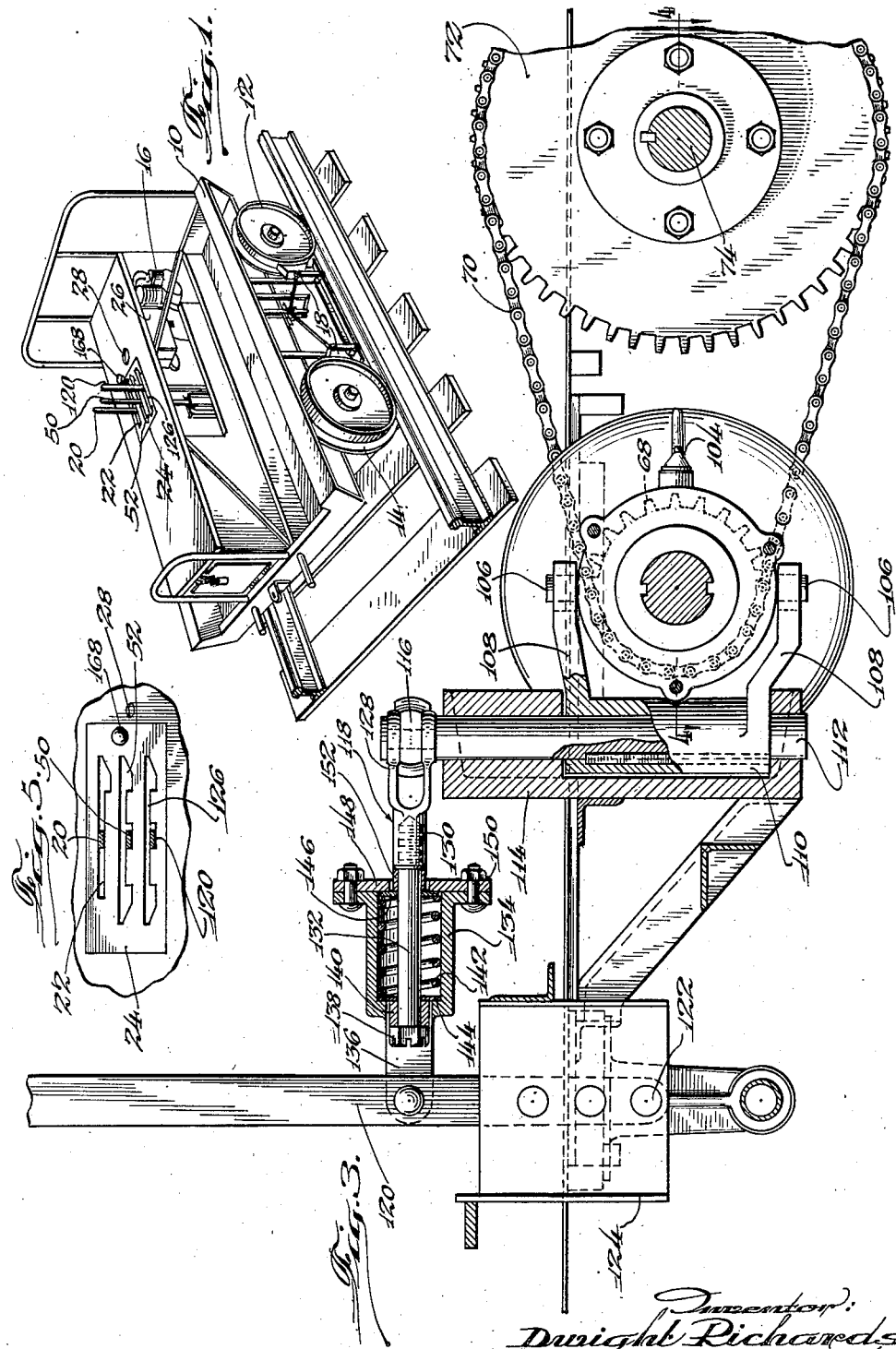
Inventor:
Dwight Richards
By Williams, Bradbury & Hinkle
Attorneys June 4, 1946. D. RICHARDS 2,401,317
MOTOR CAR
Filed Nov. 25, 1942 3 Sheets-Sheet 2
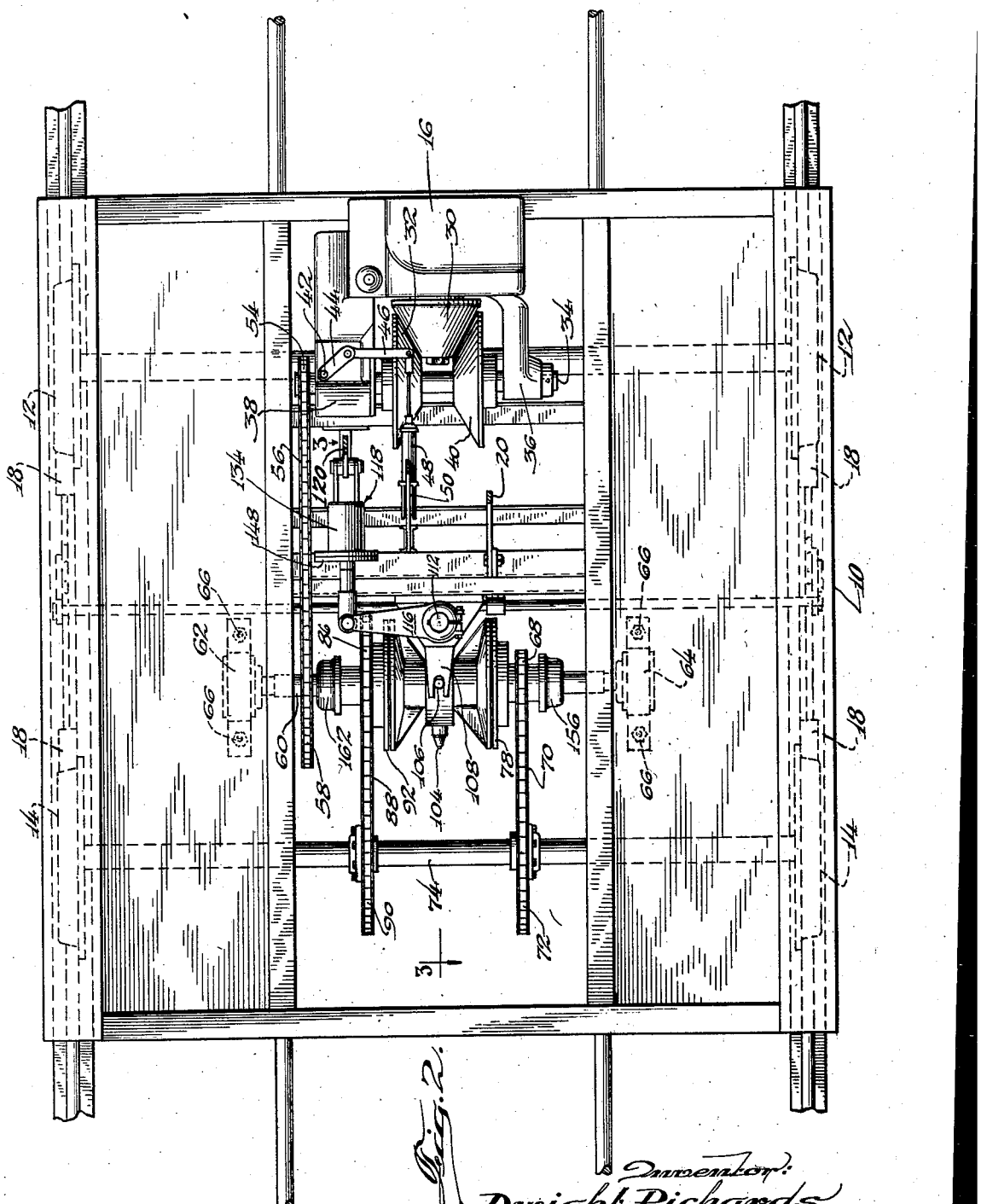

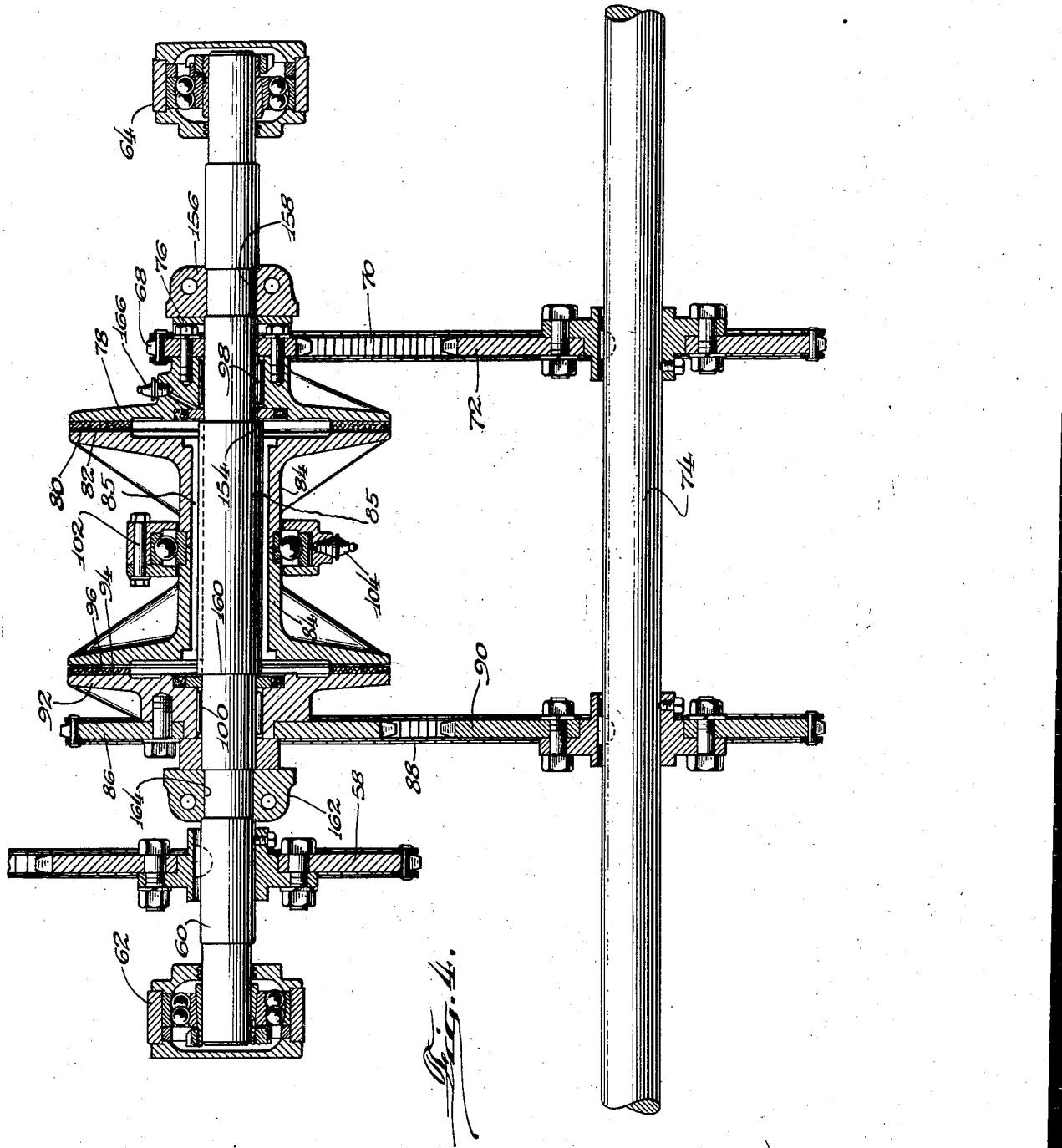

Patented June 4, 1946

2,401,317

UNITED STATES PATENT OFFICE 2,401,317

MOTORCAR

Dwight Richards, Harvey, Ill., assignor to The Buda Company, Harvey, Ill., a corporation of Illinois Application November 25, 1942, Serial No. 466,847

2 Claims. (Cl. 105—101)

My invention relates to motor cars and is more particularly concerned with motor cars of the type used by railroads for the transportation of employees engaged in track inspection, maintenance and repair, and the tools and equipment which they must have with them to perform their various duties.

An object of my invention is to provide a motor car having a lightweight, inexpensive, two-speed drive.

Another object of my invention is to provide a motor car having a new and improved, two-speed drive which is equally effective when the car is operating in either direction, and having a compact easily accessible control.

Other objects and advantages will become apparent as the description proceeds.

In the drawings:

Fig. 1 is a perspective view of a motor car embodying my invention;

Fig. 2 is a bottom view of the motor car of Fig. 1;

Fig. 3 is a view showing an irregular, vertical section taken on the line 3—3 of Fig. 2;

Fig. 4 is a view showing a partial, horizontal section of the two-speed drive and is taken on the line 4—4 of Fig. 3; and Fig. 5 is a fragmentary view showing the guide plate for the various operating levers.

In Fig. 1, I have shown a motor car comprising a body 10 mounted on front and rear wheels 12 and 14, respectively, and driven by an internal combustion engine 16 which is illustrated as being of the air-cooled type, although any other suitable design of motor may be utilized. The motor car is provided with brakes 18 which are operated through suitable connections from a brake lever 20 projecting upwardly through a slot 22 in a guide plate 24. The motor 16 is supplied with gasoline or other fuel from a tank 26 having a filling opening 28.

Referring more particularly to Fig. 2, it will be seen that the motor 16 drives a cone 30 which may be mounted directly on the rear end of the engine crank shaft. The cone 30 is illustrated as engaging a conical friction wheel 32 mounted on a slidable drive shaft 34 supported in bearings 36 and 38. A second conical friction wheel 40 is also mounted on the drive shaft 34 in spaced relation to the friction wheel 32 and is shown in Fig. 2 as being out of engagement with the cone 30. The drive shaft 34 is adapted to be moved axially to cause either friction wheel 32 or friction wheel 40 to engage the cone 30, the direction of rotation of the shaft 34 depending upon which of these friction wheels engages the cone 30.

The drive shaft 34 is moved axially by a control shaft 42 having an arm 44 connected to one end of a bar 46, whose other end is connected to a compound link 48; the construction of the link 48 is similar to that of link 118 to be fully described hereinafter. The other end of this compound link is connected to the lower end of a reversing lever 50, whose upper end projects through the slot 52 in the guide plate 24. The driving arrangement and mechanism for shifting the friction wheels 34 and 40 is fully illustrated and claimed in my co-pending application, Serial No. 623,244, filed October 19, 1945, and which is a division of my copending application Serial No. 438,675, filed April 13, 1942, and requires no further description or illustration herein.

A sprocket wheel 54 is mounted on the end of drive shaft 34 and drives a chain 56 which, in turn, rotates a second sprocket wheel 58 keyed to a jack shaft 60. The jack shaft 60 is mounted in bearings 62 and 64 attached by bolts 66 to the frame or body of the motor car.

A small or low speed sprocket wheel 68 is freely rotatable on the jack shaft 60 and carries a chain 70 passing over a large sprocket wheel 72 keyed to the rear axle 74 which drives the rear wheels 14 of the motor car. The sprocket wheel 68 is secured by bolts 76 to a friction member 78 having an annular friction lining 80 suitably attached thereto. The lining 80 is adapted to be engaged by the friction surface 82 formed on one end of a spool 84. The spool 84 is composed of identical halves which are secured together by a pair of U-shaped keys 85. The keys cause the spool to rotate with jack shaft 60, but permit the spool to slide axially of this shaft for purposes which I shall later describe.

A larger or high speed sprocket wheel 86 is rotatably mounted on the jack shaft 60 and carries a chain 88 passing over a sprocket wheel 90 keyed to the rear axle 74. The sprocket wheels 72 and 90 are illustrated as being of the same size and this arrangement has the advantage of reducing the number of different parts. If desired, however, the sprocket wheels 72 and 90 may be made of different sizes and the associated sprocket wheels 68 and 86 made of any suitable sizes to give the desired high and low speed relationship.

The high speed sprocket wheel is provided with a friction member 92 having an annular friction lining 94 for engagement with the friction surface 96 formed at the other end of the spool 84. In the drawings, the sprocket wheels 68 and 86 are illustrated as being supported on the needle bearings 98 and 100, respectively, although any other suitable mounting for these sprocket wheels may be provided.

The spool 84 rotates in a ball bearing collar 102 having a lubricating fitting 104 and a pair of pins 106 located in the forked end of the arms 108, integral with a sleeve 110 which is keyed to and rotatable with a vertical shaft 112 journaled in a supporting block 114 attached to the frame of the motor car. An arm 116 is attached to the upper end of the shaft 112 and is also connected to one end of a compound pressure control link 118 whose other end is pivotally connected to a speed control lever 120.

The lower end of the control lever 120 is pivotally mounted by pin 122 to a support 124 attached to the form or body of the motor car. Both the lever 120 and the support 124 are provided with a plurality of registerable openings for receiving the pin 122 so that the effective stroke of the lever 120 and corresponding movement of the spool 84 can be varied to compensate for wear by shifting the pin 122 from one pair of registering openings to another. The upper end of the lever 120 projects through a slot 126 in the plate 24.

The compound force controlling link 118, which is of the type disclosed and claimed in my copending application, Serial No. 623,244, filed October 19, 1945, comprises a clevis 128 attached to one end of the arm 116 and having a socket 130 receiving the threaded end of a pin 132 passing through a cylinder 134 having legs 136 pivoted to the lever 120. A nut 138 is threadedly attached to the lefthand end of the pin 132 and abuts a sleeve 140 slidably located in an opening in the base of cylinder 134.

A coil spring 142 is located in the cylinder 134 and is confined between annular washers 144 and 146. The righthand end of the cylinder 134 is closed by a plate 148 secured to the cylinder by bolts 150. A second sleeve 152 is located between the washer 146 and the socket 130. The arrangement of the parts of the compound pressure control link 118 are such that a force exerted on the lever 120 in either direction will be resiliently transmitted to the friction spool 84.

The direction of travel of the motor car is controlled by the reverse lever 50. In Fig. 5, this lever is illustrated as being in neutral position and is located in the central notch of its slot 52 in the plate 124. When it is desired that the motor car operate in a forward direction, the lever 50 is moved to the appropriate end of its slot 52 and moved laterally to engage the notch at this end of the slot. If the friction spool 84 is in engagement with either the low speed sprocket wheel 68 or the high speed sprocket wheel 86, the motor car will move in the desired direction, assuming that the engine 16 is operating. If it is desired to reverse the direction of travel of the motor car, the lever 50 is moved from one end of its slot 52 to the opposite end thereof and is engaged in the notch at the latter end of the slot. The compound link 48 resiliently limits the pressure with which the friction wheels 32 and 40 can be pressed against the driving cone 30 and prevents damage to these parts by the exertion of too much force on the reversing lever 50.

The speed of the vehicle, and to a large extent the starting and stopping of the vehicle, is controlled by the lever 120, located alongside the reversing lever 50 between the reverse and two-speed drives. When this lever is in the neutral position shown in Fig. 5, the motor car can not be driven in either a forward or reverse direction and to connect either the high speed or the low speed drive it is necessary to move the lever 120 to the desired end of its slot 126 which is provided with end notches for holding the lever in either selected driving position. The force exerted on the lever 120 is transmitted to the friction spool 84 through the compression spring 142 regardless of the direction in which the lever 120 is moved and this spring prevents a rough operator from exerting undue force on the spool 84 and its operating parts.

When the lever is moved to the left, as viewed in Fig. 3, it exerts a pull on the cylinder 134 and this pull is transmitted to spring 142 through washer 146. The other end of the spring acts on washer 144, sleeve 140 and nut 138 to exert a leftward pull on pin 132 and clevis 128 to shift the friction spool. On the other hand, if the lever 120 is moved to the right, as viewed in Fig. 3, the lefthand end or base of the cylinder 134 presses against washer 144 to exert a compressive force on the lefthand end of the spring 142. This force is transmitted through the spring to washer 146 and this washer, in turn, acts through sleeve 152 upon the socket end 130 of the clevis 128 to actuate the spool shifting mechanism.

When the friction spool 84 is moved to the right, as viewed in Fig. 4, the friction surface 82 at the end of this spool engages the friction ring 80 associated with the low speed sprocket wheel 68 and serves frictionally to connect this sprocket wheel with the jack shaft 60. Rotation of a sprocket wheel 68 acts through chain 70 to rotate sprocket wheel 72 and since this latter sprocket wheel is keyed to the rear axle 74, the motor car is driven at low speed through the rear wheels 14. As the sprocket wheel 90 is also keyed to axle 74, rotation of axle 74 results in rotation of sprocket wheels 90 and 86. The latter, however, merely rotates idly on the jack shaft 60 and consumes a minimum of power due to the low friction of the needle bearing 100.

When the friction spool 84 is moved to the left, as viewed in Fig. 4, the friction surface 96 at the other end of this spool engages friction ring 94 and drives high speed sprocket wheel 86 which, in turn, drives chain 88, sprocket wheel 90 and rear axle 74. Under these conditions, sprocket wheel 72 drives chain 70 and low speed sprocket wheel 68, but the latter merely revolves idly on the jack shaft 60. The friction rings 80 and 94 have large areas engageable with the friction surfaces 82 and 96, respectively, of the spool 84 and this feature of my invention makes it possible to utilize the friction spool 84 as a clutch to connect the rotating jack shaft 60 with the low speed sprocket wheel 86 without stalling the engine when the motor car is heavily loaded or is at rest on an upgrade. Because of these large engaging surfaces, the friction spool 84 is much better adapted to this purpose than are the friction wheels 32 and 40 which have relatively small surfaces engageable with the cone 30. After the motor car has once attained momentum, the motor usually has sufficient power to drive the car in high speed and the friction spool 84 can readily be shifted from engagement with the friction ring 80 of the low speed sprocket wheel 68 and into engagement with the friction ring 94 of the high speed sprocket wheel 86 without changing the position of the engine throttle.

The low speed sprocket wheel 68 and its associated friction member 78 are prevented from movement axially of the jack shaft 60 by the shoulder 154 and two-part collar 156 located in a shallow groove 158 in the jack shaft 60. The high speed sprocket wheel 86 and its friction member 92 are similarly located between shoulder 160 and a two-part collar 162 located in groove 164 of the jack shaft. The needle bearing 98 is lubricated by means of a lubricant receiving nipple 166 and a similar nipple may be provided for lubricating the needle bearing 100.

When the motor car is being driven in either a forward or reverse direction, the brake control lever 20 will normally be at the lefthand end of its slot 32, where it will be held by the usual retractable springs for withdrawing the brake blocks 18 from engagement with the wheels. When it is desired to lock the brakes in said position, the lever is moved into the notch at the righthand end of its slot, as viewed in Fig. 5. The power delivered by the motor 26 is regulated as desired by means of the throttle control button 168.

From the foregoing description it will be apparent that I have provided a motor car having a novel two-speed drive which increases both the carrying capacity and speed of the motor car and which may be readily engaged when the motor car is on an upgrade or is heavily loaded to start the car without stalling the engine and which is equally adaptable for shifting between high and low speeds while the engine is pulling under a heavy load. These advantages are provided in a mechanism which is inexpensive to manufacture and assemble, which is easily serviced and may be made as rugged as desired, yet which is sufficiently light so that it does not substantially increase the burden of manually removing the motor car from the track or replacing it thereon.

While I have illustrated and described only a single embodiment of my invention, it is to be understood that my invention is not limited to the details shown and described, but may assume numerous other forms and that the scope of my invention is defined in the following claims.

I claim:

1. In a lightweight, manually liftable motor car of the type having an internal combustion engine, and a reversible shaft driven by said internal combustion engine through a manually operable reversing mechanism, the combination of a pair of additional shafts mounted substantially parallel to said engine driven shaft, one of said pair of shafts being located between the engine driven shaft and the other of said pair of shafts, and said engine driven shaft and the other of said pair of shafts being located near opposite ends of the car, chain and sprocket means connecting said driven shaft and said one of said additional shafts, a low speed sprocket wheel mounted on each of said additional shafts, a high speed sprocket wheel mounted on each of said additional shafts, a chain connecting said low speed sprocket wheels, a second chain connecting said high speed sprocket wheels, means fixedly connecting the other of said additional shafts with the low and high speed sprocket wheels mounted thereon, a friction spool mounted on said one of the additional shafts and interposed between the high and low speed sprocket wheels mounted thereon, said last-named wheels having friction rings associated therewith, means connecting said friction spool for rotation with said one shaft on which it is mounted, but permitting said spool to move axially of said shaft to engage either of said friction rings, said spool having friction surfaces for selectively engaging said rings, adjustable manual means for shifting said spool into engagement with either of said rings whereby the wear of the friction surfaces is compensated for, said manual means including a resilient, force-limiting mechanism, and track engaging wheels driven by the first of said additional shafts, said manually reversing mechanism and manual spool shifting means including manually movable levers located between said one of the additional shafts and the engine driven shaft.

2. In a light weight manually liftable motor car of the type having an internal combustion engine and a reversible transversely disposed shaft located near one end of the car driven by said internal combustion engine through a manually operable reversing mechanism, the combination of a pair of additional shafts mounted substantially parallel to said engine driven shaft, one of said pair of shafts being located between the engine driven shaft and the other of said pair of shafts and said other being disposed nearer the opposite end of the car, driving means connecting said engine driven shaft and said one of said pair of additional shafts, low speed driving means interconnecting said additional shafts including a frictional driven member loosely mounted on said one shaft, high speed driving means interconnecting said pair of additional shafts including a frictional driven member loosely mounted on said one shaft, means including an axially shiftable friction spool splined to said one shaft and interposed between the high and low speed frictional driven members, and manual means for shifting said spool in opposite directions selectively to engage the low or high speed frictional driven members, said manually operable reversing mechanism and manual spool shifting means including manually movable levers located between said one of the additional shafts and the engine driven shaft.

DWIGHT RICHARDS